United States Patent Office 2,740,699

Patented Apr. 3, 1956

2,740,699

SURFACE PROCESSING

Frederic Koury, Lexington, Mass., assignor to Sylvania Electric Products Inc., a corporation of Massachusetts No Drawing. Original application July 23, 1949, Serial No. 106,493. Divided and this application April 27, 1953, Serial No. 351,519

12 Claims. (Cl. 41—42)

The present invention relates to the manufacture of germanium translating and transducing devices, and particularly to reagents and etching methods for preparing such devices, and to the resulting germanium translators. This application is a division of my earlier filed application Serial No. 106,493 filed July 23, 1949, now abandoned.

In a customery procedure for preparing rectifying-contact semiconductor devices, purified germanium is melted and slowly cooled to promote crystallization and a suitable doping constituent is included. The resulting ingot is sliced into slabs with a diamond wheel, and polished, a procedure providing a true, flat surface against which one or more resilient whiskers, individually constituting rectifying contacts, are ultimately pressed to constitute a semiconductor translator. The mechanically-worked germanium on the surface of the slab should be removed for best electrical characteristics.

Heretofore, it was commonplace to surface-treat crystalline germanium by an aqueous etching bath, including hydrofluoric acid, nitric acid, and a small quantity of cupric nitrate. The function of the cupric nitrate is somewhat obscure, but it appears to be necessary for the effective action of the HF—$HNO_3$ bath. The maximum voltage that acceptable rectifiers will withstand in the inverse or nominal non-conducting direction and the inverse resistance of rectifiers using germanium etched as described, leaves much to be desired.

Accordingly, it is an object of the invention to provide improved reagents for surface-treating crystalline germanium in order to prepare the germanium for incorporation into a crystal translator.

A further object of the invention is to provide a substitute reagent and process for etching germanium.

Certain of these objects are realized by using hydrogen peroxide with hydrofluoric acid as disclosed and claimed in my earlier filed application. The mechanism involved in the etching of germanium by means of the novel HF—$H_2O_2$ bath is not a simple one. Water itself is known to dissolve certain physical forms of germanium oxide. However, it has been found that each constituent separately in an aqueous bath is inoperative to produce acceptable rectifying surfaces, but with the combination of the hydrofluoric acid and the hydrogen peroxide, a surface is provided which, with a suitable contact, yield devices of excellent rectifying properties.

Although the above form of etching bath represents a notable achievement in the surface treatment of germanium preparatory to fabrication into rectifying-contact semi-conductor devices, there is an extreme industrial hazard incident to the use of hydrofluoric acid. It is known to be an extreme corrosive, especially when persons applying the process may be exposed to the reagents.

The present application is concerned specifically with the form disclosed in my aforesaid earlier filed application relating to an etching bath for germanium, which includes hydrogen peroxide and alkali-metal hydroxides, including calcium hydroxide, potassium hydroxide, and sodium hydroxide, and salts of these metals that decompose in water to yield the appropriate hydroxides. Specifically, it is my firm belief that in the hydrogen peroxide-and-alkali metal hydroxide bath, the hydrogen peroxide is a powerful oxidizing agent which reacts with germanium to produce its oxide, while the alkali-metal hydroxide acts as a solvent for the germanium oxide, and in this way removes objectionable mechanically deformed metallic germanium from the crystalline germanium surface.

In accordance with this aspect of the invention, there is provided an improved etchent for surface-treating crystalline germanium, minimizing the risk of industrial hazard, such as the damage and injury to human skin incident to exposure to HF.

As a further feature of the present invention, starting materials, including peroxides of sodium, and potassium, are hydrolized to yield the corresponding hydroxides and hydrogen peroxide in aqueous solution. The solution products of these peroxides, as well as aqueous solutions of alkali metal hydroxides plus hydrogen peroxide, result in high yields of excellent semiconductor units.

A presently preferred process includes the cutting of slabs of germanium of approximately .03 inch thickness, the germanium being appropriately doped and polished with 600–A grit metallographic paper and being swabbed with cotton dipped in acetone.

The polished surfaces of the slabs are etched in order to expose surfaces of the germanium having desirable electrical characteristics. An effective illustrative bath includes approximately 36 grams of sodium peroxide per hundred milliliters of water. The sodium peroxide is sprinkled into a container of water which holds the germanium wafers to be etched. There is an active bubbling that takes place, and the solution is self-heating, rising to about 45° C. The bubbling subsides and the treatment is completed in about ten minutes. The concentration is subject to appreciable variation, 25 to 40 grams per 100 milliliters being effective. The temperature of the reaction seems not to be critical, but either cooling or heating appears to be detrimental to best results. In place of the sodium peroxide solution, a bath of equal parts of 25% sodium hydroxide in water and 30% hydrogen peroxide in water may be used effectively to etch germanium, where the sodium should perferably be added first whereupon the solution heats itself and the hydrogen peroxide is then added. Three to four minutes is effective for etching the germanium.

Subsequent to etching for appropriate periods, the ingredients used are flushed away by a water wash, and/or volatile organic liquids.

Diodes using germanium prepared in this manner may be completed by supporting the germanium with the prepared surface engaged by one or more suitable rectifying contacts, in accordance with a range of well known forms of construction.

What is claimed is:

1. The method of etching a germanium crystal including the steps of immersing the crystal in an alkaline water solution of an alkali-metal peroxide.

2. The method of etching a germanium crystal including the steps of immersing the crystal in an alkaline water solution of an alkali-metal peroxide of the group consisting of sodium peroxide and potassium peroxide.

3. The process of preparing a surface of a body of germanium for use in a semiconductor translator which includes etching said surface in an alkaline aqueous solution of sodium peroxide.

4. The process of preparing a surface of a body of germanium for use in a semiconductor translator which includes etching said surface in an alkaline aqueous solution of potassium peroxide.

5. The method of preparing a surface of a germanium body for use in a semiconductor translator which includes immersing said surface in an alkaline solution of hydrogen peroxide and an alkali-metal hydroxide.

6. The method of preparing a surface of a germanium body for use in a semiconductor translator which includes immersing said surface in an alkaline solution of hydrogen peroxide and an alkali-metal hydroxide of the group consisting of sodium hydroxide and potassium hydroxide.

7. The method of preparing a surface of a germanium body for use in a semiconductor translator which includes immersing said surface in an alkaline aqueous solution of hydrogen peroxide and sodium hydroxide.

8. The method of preparing a surface of a germanium body for use in a semiconductor translator which includes immersing said surface in an alkaline aqueous solution of hydrogen peroxide and potassium hydroxide.

9. The method of making germanium crystal translators including the steps of cutting a doped ingot of germanium into slabs, and etching a cut surface of a slab in an alkaline aqueous solution of an alkali metal peroxide.

10. The method of making germanium crystal translators including the steps of cutting a doped ingot of germanium into slabs, and etching a cut surface of a slab in an alkaline aqueous solution of an alkali metal peroxide of the group consisting of sodium peroxide and potassium peroxide.

11. The method of etching crystalline germanium including the step of immersing a specimen of germanium in an alkaline aqueous solution containing approximately 36 grams per hundred milliliters of sodium peroxide.

12. The method of making a germanium crystal translator which includes the steps of etching a specimen of crystalline germanium in an alkaline aqueous solution of an alkali-metal peroxide of the group consisting of sodium peroxide and potassium peroxide, and assembling the etched specimen in engagement with a rectifying contact.

References Cited in the file of this patent

UNITED STATES PATENTS

| | | |
|---|---|---|
| 2,577,803 | Pfann | Dec. 11, 1951 |
| 2,588,008 | Jones et al. | Mar. 4, 1952 |
| 2,619,414 | Heidenreich | Nov. 25, 1952 |